(12) United States Patent
Kambe

(10) Patent No.: US 7,888,598 B2
(45) Date of Patent: Feb. 15, 2011

(54) NON-HALOGEN RESIN COMPOSITION, INSULATED ELECTRICAL WIRE, AND WIRE HARNESS

(75) Inventor: Makoto Kambe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 68 days.

(21) Appl. No.: 12/292,450

(22) Filed: Nov. 19, 2008

(65) Prior Publication Data

US 2009/0133926 A1 May 28, 2009

(30) Foreign Application Priority Data

Nov. 28, 2007 (JP) ............................. 2007-307333

(51) Int. Cl.
*H01B 7/00* (2006.01)
(52) U.S. Cl. ............................. 174/110 R; 174/110 PM
(58) Field of Classification Search ............. 174/110 R, 174/110 SR, 110 PM
See application file for complete search history.

(56) References Cited

U.S. PATENT DOCUMENTS

2004/0106732 A1* 6/2004 Tsuji et al. ................... 525/94
2005/0209379 A1* 9/2005 Botkin et al. ............... 524/115

FOREIGN PATENT DOCUMENTS

| JP | 2003-313377 | | 11/2003 |
|---|---|---|---|
| JP | 2007-056204 | | 3/2007 |
| JP | 2007-063343 | | 3/2007 |
| JP | 2007056204 | * | 3/2007 |

* cited by examiner

*Primary Examiner*—Chau N Nguyen
(74) *Attorney, Agent, or Firm*—Edwards Angell Palmer & Dodge LLP

(57) ABSTRACT

The present invention provides a non-halogen resin composition, an insulated electrical wire formed of the non-halogen resin composition, and a wire harness including the insulated electrical wire. The non-halogen resin composition, comprising: (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; and (D) 0.5 to 2 parts by weight of a hydrazine-containing metal capture agent. The non-halogen resin composition exhibits excellent mechanical properties such as abrasion resistance, flame retardant property, flexibility, and long-term heat resistance, even if it contains inorganic flame retardant therein.

4 Claims, 1 Drawing Sheet

NON-HALOGEN RESIN COMPOSITION, INSULATED ELECTRICAL WIRE, AND WIRE HARNESS

CROSS-REFERENCE TO RELATED APPLICATIONS

The present application claims priority of Japanese Patent Application No. 2007-307333 filed on Nov. 28, 2007, the disclosure of which is expressly incorporated by reference herein in its entirety.

BACKGROUND OF THE INVENTION

1. Field of the Invention

The present invention relates to a non-halogen resin composition, an insulated electrical wire having a conductor and an insulated layer disposed over a circumference of the conductor and formed of the same non-halogen resin composition, and a wire harness comprising the same insulated electrical wire.

2. Description of the Related Art

Conventionally, an insulating electrical wire arranged in a vehicle has been prepared by covering a copper wire with a resin composition comprising polyvinyl chloride resin as a base resin component. This resin composition is generally referred as a "PCV resin composition". Since the polyvinyl chloride resin is self-extinguishing material, it achieves high level of flame retardant property. In addition, the hardness of the polyvinyl chloride can be easily controlled by the addition of a plasticizer thereto. Furthermore, the polyvinyl chloride resin achieves high level of abrasion resistance. Meanwhile, it is disadvantageous that the polyvinyl chloride resin can produce harmful or noxious halogen gas during or after its incineration process, thus exerting a bad influence on environment.

To overcome the afore-mentioned disadvantage, a polyolefin-based non-halogen resin composition has been deeply researched and developed. Japanese Publication of Patent Applications No. 2003-313377, 2007-56204 and 2007-63343 are directed to such a polyolefin-containing non-halogen resin composition. In such polyolefin-containing non-halogen resin composition, flame retardant property was enhanced by the addition of an inorganic flame retardant component such as metal hydroxide thereto.

However, to achieve a desired level of flame retardant property, inorganic flame retardant component should be added in a large amount to the non-halogen resin composition. In this case, the flame retardant component contained in the resin composition generally exerts a negative impact on the mechanical properties such as abrasion resistance, flexibility, heat resistance performance, and etc. of the final non-halogen resin composition.

Currently, in order to prepare an insulated electrical wire, a conductor is generally covered with the non-halogen resin composition. However, in a wire harness, above insulated electrical wire whose conductor is covered with the non-halogen resin composition is generally used together with an insulated electrical wire whose conductor is covered with the conventional PCV resin composition. As the case may be, two different insulated electrical wires are bound together. In this case, there is problem that the plasticizer contained in the PCV composition generally migrates from the insulating layer formed of PCV composition to the insulating layer formed of the non-halogen resin composition over time, thus causing long-term heat resistance to be remarkably lowered or deteriorated.

The present invention is provided to solve the afore-mentioned problems. In other words, the present invention provides a non-halogen resin composition comprising an inorganic flame retardant, and achieving remarkably enhanced level of mechanical properties such as abrasion resistance, flame retardant property, flexibility, and long-term heat resistance. Also, the present invention provides an insulated electrical wire having a conductor and an insulating layer disposed over a circumference of the conductor and formed of the afore-mentioned non-halogen resin composition in accordance with the present invention, and a wire harness comprising at least one insulated electrical wire in accordance with the present invention.

SUMMARY OF THE INVENTION

In one aspect, the present invention provides a non-halogen resin composition, comprising: (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic antioxidant; and (D) 0.5 to 2 parts by weight of a hydrazine-containing metal capture agent.

In another aspect, the present invention provides a non-halogen resin composition, comprising: (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic antioxidant; (D) 0.1 to 1.0 part by weight of a salicylic acid-containing metal capture agent; (E) 3 to 5 parts by weight of a hydrazine-containing metal capture agent; and (F) 1 to 10 parts by weight of a metal oxide.

In still another aspect, the present invention provides an insulated electrical wire, comprising: a conductor, and an insulating layer disposed over a circumference of the conductor and formed of the non-halogen resin composition as described above.

In still another aspect, the present invention provides a wire harness comprising a plurality of insulated electrical wires, the insulated electrical wires being bounded together and including at least one insulated electrical wire as described above.

DETAILED DESCRIPTION OF THE INVENTION

Figure 1:
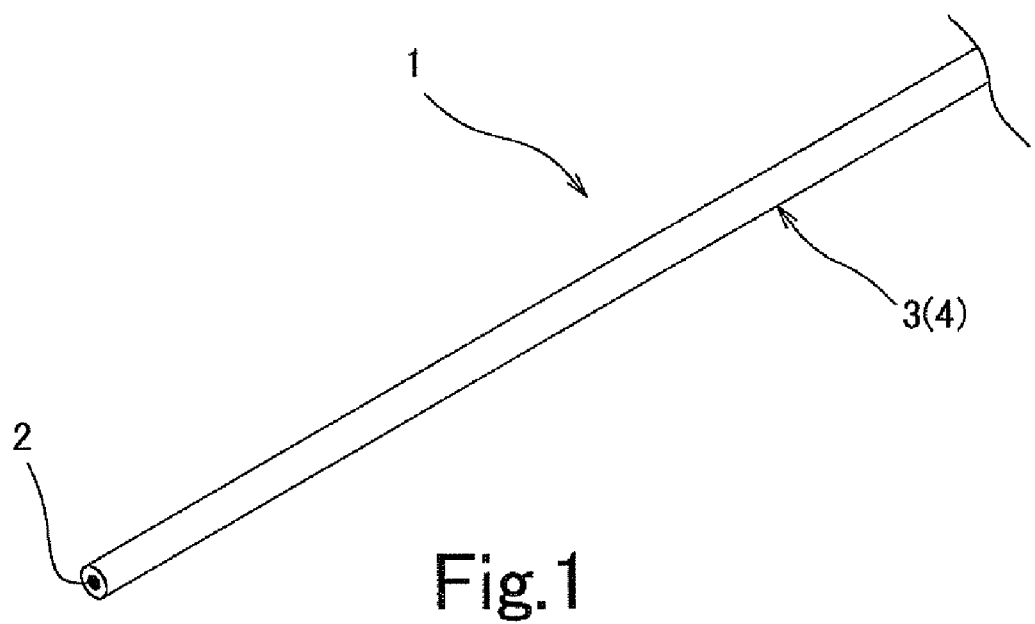
FIG. 1 shows an insulated electrical wire (1), a conductor (2) and an insulating layer formed of non-halogen resin composition (3) in accordance with the present invention.

A non-halogen resin composition in accordance with a first embodiment of the present invention will be hereinafter described in further detail. The non-halogen resin composition in accordance with the first embodiment of the present invention comprises (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; and (D) 0.5 to 2 parts by weight of a hydrazine-containing metal capture agent, based on the total parts by weight of the base resin.

As the polypropylene resin, propylene homopolymer may be employed. The polypropylene resin generally achieves high levels of mechanical properties such as stretch property and abrasion resistance, and chemical resistance.

Propylene-alpha olefin copolymer (i.e., copolymer of propylene and alpha olefin) component which may be employed in the present invention includes, but is not limited to, 1-butene, 1-pentene, 4-methyl-1-pentene, 1-hexene, 1-octene, 1-decene, 1-dodecene, or a combination thereof.

Propylene-alpha olefin copolymer which may be employed in the present invention includes, but is not limited to, a random copolymer of propylene and 1-butene, a random copolymer of propylene and 1-hexene, or a combination thereof.

Low density polyethylene resin which may be employed in the present invention includes, but is not limited to, a randomly branched polyethylene. In a preferred embodiment, the low density polyethylene resin having a density of from 0.910 to 0.930 may be employed. The low density polyethylene resin achieves low level of hardness, in comparison with linear high-density polyethylene resin.

The base rein contains 50 to 75 weight percent of the polypropylene, 20 to 40 weight percent of the propylene-alpha olefin copolymer, and 5 to 10 weight percent of the low density polyethylene resin. If the polypropylene resin were present in an amount less than 50 weight percent, sufficient abrasion resistance would not be conferred to the final non-halogen resin composition (refer to Comparative Example A-1, and etc.). On the contrary, if the polypropylene resin were present in an amount greater than 75 weight percent, the flexibility of the non-halogen resin composition would be lowered (refer to Comparative Example A-20). Further, if the polypropylene component were present in an amount of less than 50 weight percent, either the propylene-alpha olefin copolymer or the low density polyethylene resin would be present in an amount beyond the desired range. In addition, if propylene-alpha olefin copolymer were present in an amount less than 20 weight percent, the flexibility of the final non-halogen resin composition would be lowered (Refer to Comparative Example A-21, and etc.). If propylene-alpha olefin copolymer were present in an amount of greater than 40 weight percent, abrasion resistance of the final non-halogen resin composition would be lowered. (Refer to Comparative Example A-22, and etc.). Further, if the low density polyethylene resin were present in an amount of less than 5 weight percent, the abrasion resistance of the non-halogen resin composition would be lowered. (Refer to Comparative Example A-23, and etc.) On the contrary, if the low density polyethylene resin were present in an amount of greater than 10 weight percent, the flexibility of the non-halogen resin composition would be lowered (Refer to Comparative Example A-24, and etc.).

Metal hydroxide is added to the non-halogen resin composition so as to confer flame retardant property thereto. Metal hydroxide which may be employed in the present invention includes, but is not limited to, magnesium hydroxide, aluminum hydroxide, antimony trioxide, antimony pentoxide, zinc borate, or a combination thereof.

The metal hydroxide is present in an amount of 50 to 100 parts by weight, based on 100 parts by weight of the base resin used. If the metal hydroxide were present in an amount of less than 50 parts by weight, sufficient flame retardant property would not be imparted to the final non-halogen resin composition (Refer to Comparative Example A-25). On the contrary, if the metal hydroxide were present in an amount of greater than 100 parts by weight, flame retardant property would not be enhanced in proportion to the increased dosage thereof, and stretch property (i.e., tensile elongation) and long-term heat resistance would be lowered (Refer to Comparative Example A-26).

The phenolic anti-oxidant which may be employed in the present invention includes, but is not limited to,
2,6-di-tert-butyl-4-methylphenol,
tetrakis[methylene-3-(3',5'-di-tert-butyl-4-hydroxyphenyl)propionate]methane,
octadecyl-3-(3,5-di-tert-butyl-4-hydroxyphenyl)propionate,
3,9-bis{2-[3-(3-tert-butyl-4-hydroxy-5-methylphenyl) propionyloxy]-1,1-dimethylethyl}-2,4,8,10-tetraoxaspiro[5,5]undecane,
1,3,5-tris2[3(3,5-di-tert-butyl-4-hydroxyphenyl)propionyloxy]ethyl isocyanate,
1,3,5-trimethyl-2,4,6-tris(3,5-di-tert-butyl-4-hydroxybenzyl)benzene,
Tris(3,5-di-tert-butyl-4-hydroxybenzyl)isocyanurate,
1,3,5-tris(4-tert-butyl-3-hydroxy-2,6-dimethylbenzyl)isocyanurate,
pentaerythritol tetrakis[3-(3,5-di-tert-butyl-4-hydroxyphenyl)propionate],
triethyleneglycol-N-bis-3-(3-tert-butyl-5-methyl-4-hydroxyphenyl)propionate,
1,6-hexanediol bis[3-(3,5-di-tert-butyl-4-hydroxyphenyl) propionate],
2,2-thiobis-diethylenebis[3-(3,5-di-tert-butyl-4-hydroxyphenyl)propionate],
2,2'-methylene-bis-(4-methyl-6-tert-butylphenol),
2,2'-methylene-bis-(4-ethyl-6-tert-butylphenol),
2,2'-methylene-bis-(4,6-di-tert-butylphenol),
2,2'-ethylidene-bis-(4,6-di-tert-butylphenol) (Cheminox 1129),
2,2'-butylidene-bis-(4-methyl-6-tert-butylphenol),
4,4'-butylidene-bis-(3-methyl-6-tert-butylphenol),
2-tert-butyl-6-(3-tert-butyl-2-hydroxy-5-methylbenzyl)-4-methylphenyl acrylate,
2,4-di-tert-amyl-6-[1-(3,5-di-tert-amyl-2-hydroxyphenyl) ethyl]phenyl acrylate, tocopherols, or a combination thereof. Tocopherol which may be employed in the present invention includes, but is not limited to, α-tocopherol (i.e., 5,7,8-trimethyltocol), β-tocopherol (i.e., 5,8-dimethyltocol), γ-tocopherol (i.e., 7,8-dimethyltocol), δ-tocopherol (i.e., 8-methyltocol) or a combination thereof.

The phenolic anti-oxidant is present in an amount of 3 to 5 parts by weight, based on 100 parts by weight of the base resin used. If the phenolic anti-oxidant were present in an amount of less than 3 parts by weight, the desired long-term heat resistance would not be achieved (Refer to Comparative Example A-27). On the contrary, if the phenolic anti-oxidant were present in an amount of greater than 5 parts by weight, long-term heat resistance would not be enhanced in proportion to the increased dosage thereof, as well as bleeding of the non-halogen resin composition would occur (Refer to Comparative Example A-28).

The hydrazine-containing metal capture agent which may be employed in the present invention includes, but is not limited to,
2-ethyoxy-2'-ethyloxanilide,
5-tert-butyl-2-ethoxy-2'-ethyloxanilide,
N,N-diethyl-N',N'-diphenyloxamide,
N,N'-diethyl-N,N'-diphenyloxamide, oxalic acid-bis(benzilidenehydrazide), thiodipropionic acid-bis(benzilidenehydrazide),
isophthalic acid-bis(2-phenoxypropionylhydrazide),
bis(salicyloylhydrazine),
N-salicylidene-N'-salicyloylhydrazone,
2',3-bis{[3-(3,5-di-tert-butyl-4-hydroxyphenyl)propionyl]}propionohydrazide, or a combination thereof.

The hydrazine-containing metal capture agent is added in an amount of from 0.5 to 2 parts by weight, based on 100 parts by weight of the base resin used. If the hydrazine-containing metal capture agent were present in an amount of less than 0.5 parts by weight, sufficient long-term heat resistance would not be conferred to the final non-halogen resin composition (Refer to Comparative Example A-29). On the contrary, if the hydrazine-containing metal capture agent were present in an amount of greater than 2 parts by weight, long-term heat resistance would not be enhanced in proportion to the increased dosage thereof, as well as bleeding of the non-halogen resin composition would occur (Refer to Comparative Example A-30).

The afore-mentioned non-halogen resin composition is blended in the predetermined combination ratio as mentioned above. The non-halogen resin composition in accordance with the present invention exhibits an enhanced flexibility by means of the addition of the propylene-alpha olefin copolymer thereto; also achieves an enhanced abrasion resistance by means of the addition of low density polyethylene resin thereto; achieves an enhanced flame retardant property by means of the addition of metal hydroxide thereto; and achieves enhanced long-term heat resistance by means of the addition of phenolic anti-oxidant and hydrazine-containing metal capture agent thereto.

Further, since the non-halogen resin composition in accordance with the first embodiment of the present invention contains no halogen component therein, it does not produce any halogen-containing gas during or after its incineration process. Also, the non-halogen resin composition in accordance with the first embodiment of the present invention is not cross-linked, it can be easily recycled. Moreover, the non-halogen resin composition in accordance with the first embodiment of the present invention may further include a coloring agent, a lubricant, an antistatic agent, a foaming agent and so on, or a combination thereof which do(es) not adversely affect the intrinsic effect of the present invention.

The non-halogen resin composition in accordance with the first embodiment of the present invention is generally made by blending and kneading the afore-mentioned components. The preparation of the non-halogen resin composition in accordance with the first embodiment of the present invention may be carried out based on conventional technologies. For example, the non-halogen resin composition in accordance with this embodiment of the present invention is prepared by blending the afore-mentioned components with a high-speed mixer in advance, and subsequently kneading thus obtained composition by means of a conventional mixer such as a single screw extruder, a twin screw extruder, a kneader, a roll mill, and so on.

Figure 2:
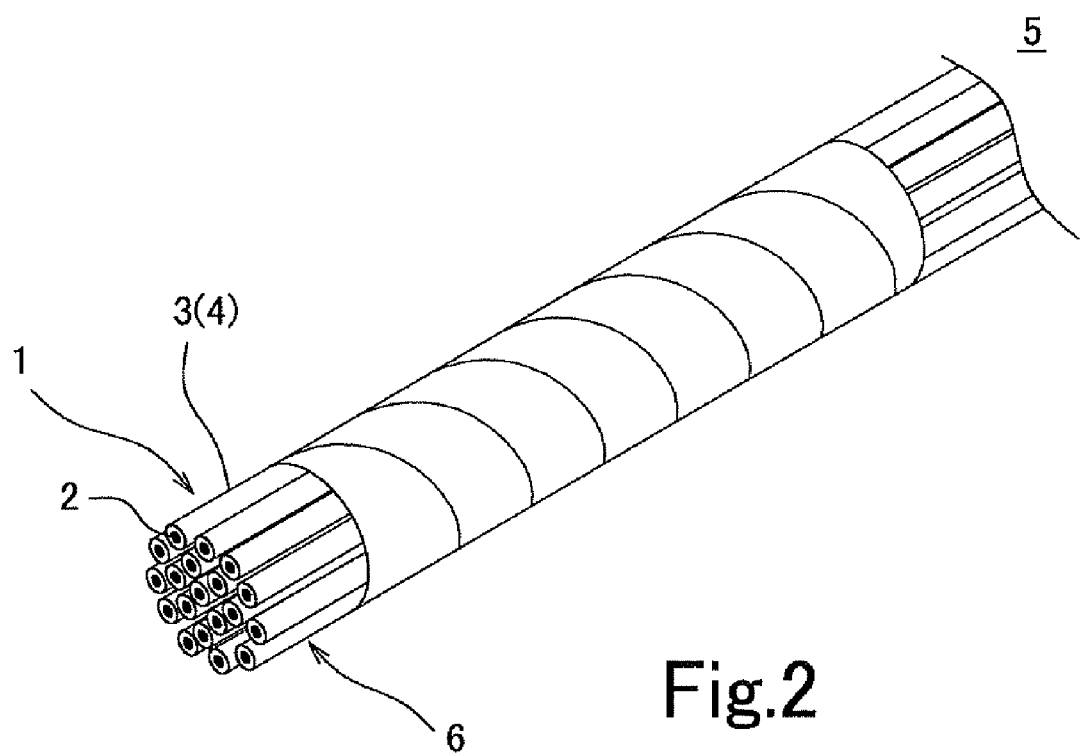
FIG. 2 shows an insulating layer formed of polyvinyl chloride-based resin composition (4); and a plurality of insulated electrical wires bounded together (6) forming a wire harness (5).

Thereafter, an insulated electrical wire which is covered with the non-halogen resin composition in accordance with the first embodiment of the present invention and a wire harness which has the same insulated electrical wire arranged therein are illustrated in further detail in FIGS. 1 and 2. In FIG. 1, the insulated electrical wire (1) includes, but is not limited to, a single wire, a flat wire, a shielded wire, and so on. The insulated electrical (1) wire comprises a conductor (2) surrounded by an insulating material which is formed of the non-halogen resin composition (3) in accordance with the first embodiment of the present invention. The conductor (2) is made of metal material such as copper, aluminum, and so on, and is generally linearly shaped. In this case, as the conductor (2) a singular filament or a plurality of filaments may be employed. Further, an additional insulating material (3) may be interposed between the conductor (2) and the insulating material (3).

In order to prepare the insulated electrical wire, the non-halogen resin composition can be applied onto the conductor by means of known various technologies. For example, conventional extrusion molding apparatus may be employed. Extruder which can be employed in the present invention may be a single screw extruder which includes a cylinder having its diameter Φ of from 20 mm to 90 mm and L/D of from 10 to 40, and further includes a screw, a breaker plate, a crosshead, a distributor, a nipple, and die. The non-halogen resin composition is fed into the single screw extruder which is set at desired temperature which allows the non-halogen resin composition to melt. The non-halogen resin composition which is fed into the extruder is melted and kneaded by the use of the screw, and then is fed into the crosshead in a desired amount via the breaker plate. The molten non-halogen resin composition flows into the circumference of the nipple by means of the distributor, and is extruded by the dies, thereby resulting in the insulated electrical wire whose conductor is circumferentially surrounded by the non-halogen resin composition.

Thereafter, as shown in FIG. 2, a plurality of insulated electrical wires (1) is bundled together (6), thereby resulting in a wire harness (5). A connector is engaged to the terminal of the insulated electrical wire (1). The connector comprises, for example, a terminal fitting which is generally produced by folding a metallic plate, and a connector housing being formed of synthetic resin. The terminal fitting is electrically connected to the conductor, and is received in the connector housing. The connector is fitted into other connector which is formed in other electrical device. The wire harness (5) is configured to transmit electricity and/or control signal to electrical devices.

In accordance with the present invention, since the non-halogen resin composition comprises 100 parts by weight of the base resin including 50 to 75 weight percent of polypropylene-based resin, 20 to 40 weight percent of propylene-alpha olefin copolymer, and 5 to 10 weight percent of low density polyethylene; 50 to 100 parts by weight of metal hydroxide; 3 to 5 parts by weight of phenolic anti-oxidant; and 5 to 20 parts by weight of hydrazine-containing metal capture agent, based on 100 by weight of the base resin used, the mechanical properties such as abrasion resistance, flame retardant property, flexibility, and long-term heat resistance can be remarkably enhanced.

Further, since the insulated electrical wire in accordance with the present invention includes the conductor that is surrounded by the insulating material formed of the non-halogen resin composition in accordance with the first embodiment of the present invention, the insulated electrical wire retains excellent mechanical properties such as abrasion resistance, flame retardant property, flexibility, and long-term heat resistance.

The wire harness in accordance with the present invention includes at least one insulated electrical wire as described above. Therefore, the wire harness retains excellent mechanical properties such as abrasion resistance, flame retardant property, flexibility, and long-term heat resistance.

A non-halogen resin composition in accordance with a second embodiment of the present invention will be hereinafter in great detail. The non-halogen resin composition in accordance with the second embodiment of the present invention comprises (A) 100 parts by weight of a base resin, containing 50 to 75 weight percent of a polypropylene, 20 to 40. weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; (D) 0.1 to 1.0 part by weight of a salicylic acid-containing metal capture agent; (E) 3 to 5 parts by weight of a hydrazine-containing metal capture agent; and (F) 1 to 10 parts by weight of a metal oxide.

There is no substantial difference between the non-halogen resin composition in accordance with the first embodiment of the present invention and the non-halogen resin composition in accordance with the second embodiment of the present invention in that the base resin comprising polypropylene resin, propylene-alpha olefin copolymer, and low density polyethylene resin, metal hydroxide, and phenolic anti-oxidant are employed. Thus, with respect to the second embodiment of the present invention, the identical components as described in above first embodiment of the present invention will be abbreviated except for the dosage thereof.

The base rein is comprised of 50 to 75 weight percent of polypropylene, 20 to 40 weight percent of propylene-alpha olefin copolymer, and 5 to 10 weight percent of low density polyethylene resin. If the propylene-based resin were present in an amount of less than 50 weight percent, sufficient abrasion properties would not be conferred to the final non-halogen resin composition (Refer to Comparative Examples B-12, and B-16). On the contrary, if the propylene-based resin were present in an amount of greater than 75 weight percent, the flexibility of the final resin composition would be lowered (Refer to Comparative Example B-15). Further, if the polypropylene resin were present in an amount of less than 50 weight percent, either of the propylene-alpha olefin copolymer or low density polyethylene resin would be beyond the desired range thereof. In addition, if the propylene-alpha olefin copolymer were present in an amount of less than 20 weight percent, the flexibility of the final resin composition would be lowered (Refer to Comparative Example B-17). If the propylene-alpha olefin copolymer were present in an amount of greater than 40 weight percent, abrasion resistance of the final non-halogen resin composition would be lowered (Refer to Comparative Example B-18). Further, if the low density polyethylene were present in an amount of less than 5 weight percent or greater than 10 weight percent, the abrasion resistance of the final non-halogen resin composition would be lowered (Refer to Comparative Examples B-19 and 20).

The metal hydroxide is present in an amount of 50 to 100 parts by weight, based on 100 parts by weight of the base resin used. If the metal hydroxide were present in an amount of less than 50 parts by weight, sufficient flame retardant property would not be conferred to the final non-halogen resin composition (Refer to Comparative Example B-1). On the contrary, if the metal hydroxide were present in an amount of greater than 100 parts by weight, flame retardant property would not be enhanced in proportion to the increased dosage thereof. At the same time, stretch property and long-term heat resistance are also lowered. (Refer to Comparative Example B-2).

The phenolic anti-oxidant is present in an amount of 3 to 5 parts by weight, based on 100 parts by weight of the base resin used. If the phenolic anti-oxidant were present in an amount of less than 3 parts by weight, the desired long-term heat resistance would not be conferred to the final non-halogen resin composition (Refer to Comparative Example B-4). On the contrary, if the phenolic anti-oxidant were present in an amount of greater than 5 parts by weight, long-term heat resistance would not be enhanced in proportion to the increased dosage thereof. In addition, the resin composition would bleed throughout the surface thereof (Refer to Comparative Example B-5).

Salicylic acid-containing metal capture agent which may be employed in the present invention includes, but is not limited to, N,N'-disalicylidene-ethylene diamine,
N,N'-disalicylidene-1,2-propylene diamine,
N,N'-disalicylidene-N'-methyl-dipropylene triamine,
3-(N-salicyloyl)amino-1,2,4-triazole,
decamethylenedicarboxylic acid-bis (N'-salicyloyl hydrazide), or a combination thereof.

The salicylic acid-containing metal capture agent is present in an amount of from 0.1 to 1.0 part by weight, based on 100 parts by weight of the base resin used. If the salicylic acid-containing metal capture agent were present in an amount of less than 0.1 part by weight, long-term heat resistance would not be achieved (Refer to Comparative Example B-6). On the contrary, if the salicylic acid-containing metal capture agent were present in an amount of greater than 1.0 part by weight, long-term heat resistance would not be enhanced in proportion to the increased dosage of the salicylic-based metal capture agent. In addition, the stretch property would be reduced (Refer to Comparative Example B-7).

Hydrazine-containing metal capture agent is present in an amount of from 3 to 5 parts by weight, based on 100 parts by weight of the base resin used. If the hydrazine-containing metal capture agent were present in an amount of less than 3 parts by weight, sufficient long-term heat resistance would not be conferred to the final non-halogen resin composition (Refer to Comparative Example B-8). On the contrary, if the hydrazine-containing metal capture agent were present in an amount of greater than 5 parts by weight, long-term heat stability would not be enhanced in proportion to the increased dosage of the hydrazine-containing metal capture agent. In addition, the non-halogen resin composition bleeds thereon (Refer to Comparative Example B-9).

Metal oxide which can be employed in the present invention includes, but is not limited to, zinc oxide, magnesium oxide, aluminum oxide, or a combination thereof.

The metal oxide is present in an amount of from 1 to 10 parts by weight, based on 100 parts by weight of the base resin used. If the metal oxide were present in an amount of less than 1 part by weight, long-term heat resistance would be lowered (Refer to Comparative Example B-10). On the contrary, the metal oxide were present in an amount of greater than 10 parts by weight, both long-term heat resistance and stretch property would be lowered (Refer to Comparative Example B-11).

The non-halogen resin composition in accordance with the second embodiment of the present invention contains the propylene-alpha olefin copolymer so as to confer good flexibility thereto; contains the low density polyethylene resin so as to confer good abrasion resistance thereto; contains metal hydroxide so as to confer good flame retardant property thereto; and also contains the phenolic anti-oxidant, the salicylic acid-containing metal capture agent and the hydrazine-containing metal capture agent so as to confer good long-term heat resistance thereto, in particular, in a case where an insulated electrical wire having an insulating layer formed of the non-halogen resin composition in accordance with the second embodiment of the present invention is used together with an insulated electrical wire having an insulating layer formed of PCV resin composition. In further detail, when a conventional insulated electrical wire having an insulating layer formed of non-halogen resin composition except for the afore-mentioned non-halogen resin composition in accordance with the present invention is used together with an insulated electrical wire having an insulating layer formed of PCV resin composition, the plasticizer that is contained the PCV resin composition generally migrates from PCV resin composition to the non-halogen resin composition. Due to this phenomenon, the long-term heat resistance of the insulated electrical wire having the insulating layer formed of the conventional non-halogen resin composition is seriously deteriorated. However, in a case where the non-halogen resin composition in accordance with the present invention is employed, due to the presence of the afore-mentioned anti-oxidant, metal capture agent, and metal oxide, the plasticizer which migrates from the PCV resin composition to the non-halogen resin composition would be prevented from adversely affecting on the long-term heat resistance of the insulating layer formed of the non-halogen resin composition.

Further, since the non-halogen resin composition in accordance with this embodiment of the present invention never contains a halogen component therein, it does not produce halogen-containing gas during or after its incineration. Moreover, because the non-halogen resin composition in accordance with this embodiment of the present invention is not cross-linked, it can be easily recycled. Also, the non-halogen resin composition in accordance with this embodiment of the present invention may further include a coloring agent, a lubricant, an antistatic agent, a foaming agent, or a combination thereof which do(es) not adversely affect the intrinsic effect of the present invention.

In accordance with this embodiment of the present invention, since the non-halogen resin composition comprises (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; (D) 0.1 to 1.0 part by weight of a salicylic acid-containing metal capture agent; (E) 3 to 5 parts by weight of a hydrazine-containing metal capture agent; and (F) 1 to 10 parts by weight of a metal oxide, the mechanical properties such as abrasion resistance, flame retardant property, flexibility, and long-term heat resistance is remarkably enhanced. Further, the non-halogen resin composition in accordance with this embodiment of the present invention retains excellent long-term heat resistance, even if it keeps in contact with PCV resin composition for a long period of time.

In a case where an insulated electrical wire includes a conductor, and a insulating layer being disposed over a circumference of the conductor and being formed of the non-halogen resin composition in accordance with the second embodiment of the present invention, the insulated electrical wire would retain excellent mechanical properties such as abrasion resistance, flame retardant property, flexibility, and long-term heat resistance. Also, such an insulated electrical wire can retain excellent long-term heat resistance, even if it is bundled with other insulated electrical wire has an insulating covering formed of PCV resin composition for a long period of time. As a result, the insulated electrical wire can remain stable over a long period of time.

A wire harness in accordance with this embodiment of the present invention comprises a plurality of electrical wires, in particular, insulated electrical wires therein and at least one insulated electrical wire as described above. Therefore, the same wire harness retains excellent mechanical properties such as abrasion resistance, flame retardant property, flexibility, and long-term heat resistance. Further, a wire harness in which the insulated electrical wire in accordance with the present invention and other insulated electrical wire having an insulating covering formed of PCV resin composition are bounded together also retains excellent long-term heat resistance.

The singular forms "a," "an," and "the" as used herein include plural referents unless the context clearly dictates otherwise.

The present invention is further illustrated by the following non-limiting examples.

EXAMPLE

The inventor prepared the electrical wire by coating the electrical wire with the non-halogen resin composition in accordance with the first and second embodiments of the present invention. Thereafter, the electrical wire was tested and evaluated.

Each raw material used for the preparation of the afore-mentioned resin composition was listed hereinafter with its trade name and manufacturer.

As the polypropylene component, propylene homomonomer was obtained from SunAllomer Ltd. It is commercially available as PS201A (MFR=0.5 g/10 min). Propylene-alpha olefin copolymer was obtained from SunAllomer Ltd. It is commercially available as Q200F (MFR=0.8 g/10 min). Ethylene-alpha olefin copolymer was obtained from Sumitomo Chemical Co., Ltd. It is available as Excellene FX CX 1001 (MFR=1.0 g/10 min). The low density polyethylene resin was obtained from Japan Polyethylene Corporation. It is available as Novatec LD ZE41K (MFR=0.5 g/10 min). As the metal hydroxide, magnesium hydroxide was obtained from Kyowa Chemical Industry Co., Ltd. It is available as Kisuma 5A having an average particle size of 0.8 μm. As the phenolic anti-oxidant, pentaerythritol tetrakis [3-(3,5-di-tert-butyl-4-hydroxyphenyl)propionate] was obtained from Chiba Specialty Chemicals Co. Ltd. It is available as Irganox 1010. As the salicylic acid-containing metal capture agent, 3-(N-salicyloyl) amino-1,2,4-triazole was obtained from ADEKA Corporation. It is available as adekastabu CDA-1. As the hydrazine-containing metal capture agent, 2', 3-bis{[3-(3,5-di-tert-butyl-4-hydroxyphenyl)propionyl]}propionohydrazide was obtained from Chiba Specialty Chemicals Ltd. It is available as Iraganox MD 1024. As the metal oxide, zinc oxide was obtained from Mitsui Mining & Smelting Co., Ltd.

Example A

Example A was defined as a non-halogen resin composition in accordance with the first embodiment of the present invention. Each of non-halogen resin compositions in Example A was prepared by blending polypropylene resin, propylene-alpha olefin copolymer, low density polyethylene resin, metal hydroxide, phenolic anti-oxidant, and hydrazine-containing metal capture agent in a combination ratio as listed in Table 1. Thus obtained formulation was mixed by means of 200 ml-Henschel mixer, and then was kneaded by a co-rotating twin screw extruder (Φ40 mm). Specifically, the twin screw extruder, a die was set at a temperature of 200° C. Then, the non-halogen resin composition was fed into an extruder for electrical wires (Φ60 mm; L/D=24.5; FF screw), and was extruded onto a conductor of the area of 0.3395 mm$^2$ under the condition of the speed of 600 mm/min, the temperature of 230° C., thereby resulting in an insulated electrical wire having an outer diameter of 1.20 mm. In this configuration, the conductor consisted of seven stranded wires, each of wires being 0.2485 mm. Test and evaluation was carried out for thus obtained electrical wires. Table 1 below shows the test results exhibited by the formulations of Example A.

Tensile Elongation

Tensile elongation was performed in accordance with JIS B7721. In further detail, the insulated electrical wire was cut into a length of 150 mm. Thereafter, the conductor was removed from the insulated electrical wire so as to obtain a tubular test sample only formed of non-halogen resin composition. Each of test samples had a pair of markings spaced 50 mm apart. Both end portions of the sample were engaged to the chuck of a tensile testing machine at a room temperature, and were pulled in the speed of from 25 to 500 mm/min. Then, the distance between the pair of makings was measured. For the following data, the elongation must be greater than or equal to 500% for the test sample to pass. The test sample having the elongation less than 500% failed this JIS B7721 test.

Flame Retardant Property

The insulated electrical wire having a length of 600 mm was laid tilted at about 45 degrees angle. A portion which was 500 mm±5 mm away from the upper end portion of the insulated electrical wire and was a part of the insulated electrical wire was treated with reducing flame. In further detail, the afore-mentioned treatment was carried out by means of a bunsen burner for 15 seconds. To evaluate flame retardant property of the test sample, flame-out time was measured. For the following data, the flame-out time must be within 70 minutes for the test sample to pass. The test sample having the flame-out time greater than 70 minutes failed this JIS B7721 test.

Abrasion Resistance

This abrasion resistance was tested by means of a scrape abrasion tester. In other words, the insulated electrical wire having a length of about 1 m was placed on a holder, and then was secured thereto. In order to wear the insulated electrical wire, a flange having a piano line having a diameter of 45 mm at its tip portion was employed. In further detail, the flange was pressed against the insulated electrical wire by any pressing member, so that it came to contact with the insulated electrical wire. In this point, the electrical wire was subjected to a load of 7N. The flange kept reciprocating up to the point when the non-halogen resin composition was removed from the insulated electrical wire, and the piano line of the flange came in contact with the conductor portion of the insulated electrical wire. The distance for reciprocation was 14 mm. The number of the reciprocation was recorded for each test sample. For the following data, the number of reciprocation must be equal to or greater than 300 to pass. The test sample having the number of reciprocation below 300 failed this abrasion resistance.

Flexibility Performance

A plate-shaped test sample was prepared having a length of 80 mm, a width of 5 mm, and a thickness of 1.5 mm. One end portion of the test sample was secured to a fixed base so that the other end portion of the test sample extended horizontally from the fixed base. Thereafter, the weight of 20 g was added to a portion which was 10 mm away from above other end portion for the period of 30 seconds, and then the amount of flexure of the test sample was measured. For the following data, the amount of flexure of the test sample must be equal to or greater than 15 mm to pass. The test sample having the amount of flexure below 15 mm failed this flexibility performance test.

Bleeding Performance

The surface of the insulated electrical wire was subjected to visual examination. The test sample was considered to "pass", in a case the bleeding of the non-halogen resin composition did not occur. On the contrary, the test sample was considered to "fail", in a case where the bleeding of the non-halogen resin composition occurred.

Long-Term Heat Resistance I

The insulated electrical wire was allowed to stand at a temperature of 150° C. for the period of 100 hours and then was bent around the circumference thereof. The test sample was considered to "pass", in a case where it did not crack. On the contrary, the test sample was considered to "fail", in a case where it cracked.

TABLE 1

|  |  | Example A | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| component | Polypropylene | 50 | 70 | 75 | 55 | 70 | 70 | 70 | 70 | 70 | 70 |
|  | propylene-α olefin copolymer | 40 | 20 | 20 | 20 | 20 | 20 | 20 | 20 | 20 | 20 |
|  | low density polyethylene | 10 | 10 | 5 | 5 | 10 | 10 | 10 | 10 | 10 | 10 |
|  | metal hydroxide | 75 | 75 | 75 | 75 | 50 | 100 | 75 | 75 | 75 | 75 |
|  | phenolic anti-oxidant | 4 | 4 | 4 | 4 | 4 | 4 | 3 | 5 | 4 | 4 |
|  | hydrazine-containing metal capture agent | 1.25 | 1.25 | 1.25 | 1.25 | 1.25 | 1.25 | 1.25 | 1.25 | 0.5 | 2 |
| evaluation | tensile elongation | pass | pass | pass | pass | pass | pass | pass | pass | pass | pass |
|  | flame retardant property | pass | pass | pass | pass | pass | pass | pass | pass | pass | pass |
|  | abrasion resistance | pass | pass | pass | pass | pass | pass | pass | pass | pass | pass |
|  | flexibility | pass | pass | pass | pass | pass | pass | pass | pass | pass | pass |
|  | bleeding | pass | pass | pass | pass | pass | pass | pass | pass | pass | pass |
|  | long-term heat resistance I | pass | pass | pass | pass | pass | pass | pass | pass | pass | pass |

Comparative Example A

Comparative Example A will be described hereinafter. Tables 2 to 4 below show the formulations in weight percent and/or part(s) by weight used in Comparative Example A. The non-halogen resin composition in accordance with Comparative Example A basically included polypropylene resin, propylene-alpha olefin copolymer, low density polyethylene resin, metal hydroxide, phenolic anti-oxidant, and hydrazine-containing metal capture agent. Thus obtained non-halogen resin composition was applied to a conductor, thereby resulting in an insulated electrical wire. The test and evaluation were performed on the resulting insulated electrical wire. Tables 2 to 4 below show the test results exhibited by the formulations of Comparative Example A.

The components used in the preparation of a non-halogen resin composition, the method for preparing a non-halogen resin composition, the method for preparing an insulated electrical wire, and method for testing and evaluating an insulated electrical wire are abbreviated in order to avoid unnecessary overlapping with Example A as described above.

TABLE 2

| | | Comparative Example A | | | | | | | | | |
|---|---|---|---|---|---|---|---|---|---|---|---|
| | | 1 | 2 | 3 | 4 | 5 | 6 | 7 | 8 | 9 | 10 |
| component | polypropylene | 45 | 70 | 52 | 45 | 45 | 45 | 45 | 45 | 45 | 70 |
| | propylene-α olefin copolymer | 55 | 15 | 45 | 55 | 55 | 55 | 55 | 55 | 55 | 15 |
| | low density polyethylene | 0 | 15 | 3 | 0 | 0 | 0 | 0 | 0 | 0 | 15 |
| | metal hydroxide | 75 | 75 | 75 | 30 | 150 | 75 | 75 | 75 | 75 | 150 |
| | phenolic anti-oxidant | 4 | 4 | 4 | 4 | 4 | 2 | 6 | 4 | 4 | 4 |
| | hydrazine-containing metal capture agent | 1.25 | 1.25 | 1.25 | 1.25 | 1.25 | 1.25 | 1.25 | 0.1 | 3 | 1.25 |
| evaluation | tensile elongation | pass | pass | pass | pass | pass | pass | pass | pass | fail | pass |
| | flame retardant property | pass | pass | pass | pass | pass | pass | pass | pass | pass | pass |
| | abrasion resistance | fail | pass | fail | fail | fail | fail | fail | fail | fail | pass |
| | flexibility | pass | fail | pass | pass | fail | pass | pass | pass | pass | fail |
| | bleeding | pass | pass | pass | pass | pass | pass | fail | pass | fail | pass |
| | long-term heat resistance I | pass | pass | pass | pass | pass | fail | pass | fail | pass | pass |

TABLE 3

| | | Comparative Example A | | | | | | | | | |
|---|---|---|---|---|---|---|---|---|---|---|---|
| | | 11 | 12 | 13 | 14 | 15 | 16 | 17 | 18 | 19 | 20 |
| component | polypropylene | 70 | 70 | 70 | 70 | 52 | 52 | 52 | 52 | 52 | 90 |
| | propylene-α olefin copolymer | 15 | 15 | 15 | 15 | 45 | 45 | 45 | 45 | 45 | 0 |
| | low density polyethylene | 15 | 15 | 15 | 15 | 3 | 3 | 3 | 3 | 3 | 10 |
| | metal hydroxide | 75 | 75 | 75 | 75 | 150 | 75 | 75 | 75 | 75 | 75 |
| | phenolic anti-oxidant | 2 | 6 | 4 | 4 | 4 | 2 | 6 | 4 | 4 | 4 |
| | hydrazine-containing metal capture agent | 1.25 | 1.25 | 0.1 | 3 | 1.25 | 1.25 | 1.25 | 0.1 | 3 | 1.25 |
| evaluation | tensile elongation | pass | pass | pass | fail | pass | pass | pass | pass | fail | pass |
| | flame retardant property | pass | pass | pass | pass | pass | pass | pass | pass | pass | pass |
| | abrasion resistance | pass | pass | pass | pass | fail | fail | fail | fail | fail | pass |
| | flexibility | fail | fail | fail | fail | fail | pass | pass | pass | pass | fail |
| | bleeding | pass | fail | pass | fail | pass | pass | fail | pass | fail | pass |
| | long-term heat resistance I | fail | pass | fail | pass | pass | fail | pass | fail | pass | pass |

TABLE 4

| | | Comparative Example 4 | | | | | | | | | |
|---|---|---|---|---|---|---|---|---|---|---|---|
| | | 21 | 22 | 23 | 24 | 25 | 26 | 27 | 28 | 29 | 30 |
| component | polypropylene | 75 | 50 | 67 | 55 | 70 | 70 | 70 | 70 | 70 | 70 |
| | propylene-α olefin copolymer | 15 | 45 | 30 | 30 | 20 | 20 | 20 | 20 | 20 | 20 |
| | low density polyethylene | 10 | 5 | 3 | 15 | 10 | 10 | 10 | 10 | 10 | 10 |
| | metal hydroxide | 75 | 75 | 75 | 75 | 30 | 150 | 75 | 75 | 75 | 75 |
| | phenolic anti-oxidant | 4 | 4 | 4 | 4 | 4 | 4 | 2 | 10 | 4 | 4 |
| | hydrazine-containing metal capture agent | 1.25 | 1.25 | 1.25 | 1.25 | 1.25 | 1.25 | 1.25 | 1.25 | 0.1 | 5 |
| evaluation | tensile elongation | pass | pass | pass | pass | pass | fail | pass | pass | pass | pass |
| | flame retardant property | pass | pass | pass | pass | fail | pass | pass | pass | pass | pass |
| | abrasion resistance | pass | fail | fail | pass | pass | pass | pass | pass | pass | pass |
| | flexibility | fail | pass | pass | fail | pass | pass | pass | pass | pass | pass |
| | bleeding | pass | pass | pass | pass | pass | pass | pass | fail | pass | fail |
| | long-term heat resistance I | pass | pass | pass | pass | pass | fail | fail | pass | fail | pass |

As can be seen from Table 1 above, the non-halogen resin compositions in accordance with Examples A-1 through A-10 exhibited excellent tensile elongation, flame retardant property performance, abrasion resistance, flexibility, bleeding, and long-term heat resistance I.

To the contrary, as can be seen from Tables 2 to 4 above, the non-halogen resin compositions in accordance with Comparative Examples A-1 through A-30 resulted in poor tensile elongation, flame retardant property performance, abrasion resistance, flexibility, bleeding, and long-term heat resistance I, in comparison with the non-halogen resin composition of Example A-1 to A-10.

Example B

The non-halogen resin composition of Example B was prepared in accordance with the second embodiment of the present invention. Tables 5 to 7 below show the formulations in weight percent and/or part(s) by weight used in Comparative Example B. Comparative Example B basically included polypropylene resin, propylene-alpha olefin copolymer, low density polyethylene resin, metal hydroxide, phenolic anti-oxidant, salicylic acid-containing metal capture agent, and hydrazine-containing metal capture agent. Thus obtained non-halogen resin composition was applied to a conductor, thereby resulting in an insulated electrical wire. The test and evaluation were performed on the resulting insulated electrical wire. Tables 5 to 7 below show the test results exhibited by the formulations of Comparative Example B.

The components used in the preparation of the non-halogen resin composition, the method for preparing a non-halogen resin composition, the method for preparing an insulated electrical wire, and method for testing and evaluating test and evaluating an insulated electrical wire are abbreviated in order to avoid unnecessary overlapping with Example A as described above.

Long-Term Heat Resistance (II)

A bundle of insulated electrical wires (6) which included both at least one insulated electrical wire (1) in accordance with the present invention and at least one insulated electrical wire that was prepared by covering a conductor with PCV resin composition (4) was prepared. Polyvinyl chloride-based adhesive tape was wrapped around the bundle of the insulated electrical wires (1). The bundle of the insulated electrical wires (6) was allowed to stand at a temperature of 150° C. for the period of 100 hours. Thereafter, only one insulated electrical wires (1) in accordance with the present invention was taken out from the bundle of insulated electrical wires (6). The selected insulated electrical wire (1) was twisted around a wire-like rod having the same diameter as the insulated electrical wire (1). The test sample (i.e. selected insulated electrical wire) was considered to "pass", in a case where a crack did not occur in the non-halogen resin composition. On the contrary, the test sample was considered to "fail", in a case where a crack occurred in the halogen free resin composition.

TABLE 5

| | | Example B | | | | | | | | | |
|---|---|---|---|---|---|---|---|---|---|---|---|
| | | 1 | 2 | 3 | 4 | 5 | 6 | 7 | 8 | 9 | 10 |
| component | polypropylene | 50 | 50 | 50 | 50 | 70 | 70 | 70 | 70 | 75 | 75 |
| | propylene-α olefin copolymer | 40 | 40 | 40 | 40 | 20 | 20 | 20 | 20 | 20 | 20 |
| | low density polyethylene | 10 | 10 | 10 | 10 | 10 | 10 | 10 | 10 | 5 | 5 |
| | metal hydroxide | 75 | 75 | 75 | 75 | 75 | 75 | 75 | 75 | 75 | 75 |
| | phenolic anti-oxidant | 4 | 4 | 4 | 4 | 4 | 4 | 4 | 4 | 4 | 4 |
| | salicylic acid-containing metal capture agent | 0.1 | 0.5 | 0.1 | 0.5 | 0.1 | 0.5 | 0.1 | 0.5 | 0.1 | 0.5 |
| | hydrazine-containing metal capture agent | 3 | 3 | 5 | 5 | 3 | 3 | 5 | 5 | 3 | 3 |
| | metal oxide | 5 | 5 | 5 | 5 | 5 | 5 | 5 | 5 | 5 | 5 |
| evaluation | tensile elongation | pass | pass | pass | pass | pass | pass | pass | pass | pass | pass |
| | flame retardant property | pass | pass | pass | pass | pass | pass | pass | pass | pass | pass |
| | abrasion resistance | pass | pass | pass | pass | pass | pass | pass | pass | pass | pass |
| | flexibility | pass | pass | pass | pass | pass | pass | pass | pass | pass | pass |
| | bleeding | pass | pass | pass | pass | pass | pass | pass | pass | pass | pass |
| | long-term heat resistance I | pass | pass | pass | pass | pass | pass | pass | pass | pass | pass |
| | long-term heat resistance II | pass | pass | pass | pass | pass | pass | pass | pass | pass | pass |

TABLE 6

| | | Example B | | | | | | | | | |
|---|---|---|---|---|---|---|---|---|---|---|---|
| | | 11 | 12 | 13 | 14 | 15 | 16 | 17 | 18 | 19 | 20 |
| component | polypropylene | 75 | 75 | 55 | 55 | 55 | 55 | 70 | 70 | 70 | 70 |
| | propylene-α olefin copolymer | 20 | 20 | 40 | 40 | 40 | 40 | 20 | 20 | 20 | 20 |
| | low density polyethylene | 5 | 5 | 5 | 5 | 5 | 5 | 10 | 10 | 10 | 10 |
| | metal hydroxide | 75 | 75 | 75 | 75 | 75 | 75 | 50 | 100 | 75 | 75 |
| | phenolic anti-oxidant | 4 | 4 | 4 | 4 | 4 | 4 | 4 | 4 | 3 | 5 |
| | salicylic acid-containing metal capture agent | 0.1 | 0.5 | 0.1 | 0.5 | 0.1 | 0.5 | 0.5 | 0.5 | 0.5 | 0.5 |
| | hydrazine-containing metal capture agent | 5 | 5 | 3 | 3 | 5 | 5 | 3 | 3 | 3 | 3 |
| | metal oxide | 5 | 5 | 5 | 5 | 5 | 5 | 5 | 5 | 5 | 5 |
| evaluation | tensile elongation | pass | pass | pass | pass | pass | pass | pass | pass | pass | pass |
| | flame retardant property | pass | pass | pass | pass | pass | pass | pass | pass | pass | pass |
| | abrasion resistance | pass | pass | pass | pass | pass | pass | pass | pass | pass | pass |
| | flexibility | pass | pass | pass | pass | pass | pass | pass | pass | pass | pass |
| | bleeding | pass | pass | pass | pass | pass | pass | pass | pass | pass | pass |
| | long-term heat resistance I | pass | pass | pass | pass | pass | pass | pass | pass | pass | pass |
| | long-term heat resistance II | pass | pass | pass | pass | pass | pass | pass | pass | pass | pass |

TABLE 7

| | | Example B | | | |
|---|---|---|---|---|---|
| | | 21 | 22 | 23 | 24 |
| component | polypropylene | 70 | 70 | 70 | 70 |
| | propylene-α olefin copolymer | 20 | 20 | 20 | 20 |
| | low density polyethylene | 10 | 10 | 10 | 10 |
| | metal hydroxide | 75 | 75 | 75 | 75 |
| | phenolic anti-oxidant | 4 | 4 | 4 | 4 |
| | salicylic acid-containing metal capture agent | 1 | 0.5 | 0.5 | 0.5 |
| | hydrazine-containing metal capture agent | 3 | 4 | 3 | 3 |
| | metal oxide | 5 | 5 | 1 | 10 |
| evaluation | tensile elongation | Pass | pass | pass | pass |
| | flame retardant property | Pass | pass | pass | pass |
| | abrasion resistance | pass | pass | pass | pass |
| | flexibility | pass | pass | pass | pass |
| | bleeding | pass | pass | pass | pass |
| | long-term heat resistance I | pass | pass | pass | pass |
| | long-term heat resistance II | pass | pass | pass | pass |

Comparative Example B

Comparative Example B will be described hereinafter. Tables 8 to 10 below show the formulations in weight percent and/or part(s) by weight used in Comparative Example B. Comparative Example B basically included polypropylene resin, propylene-alpha olefin copolymer, low density polyethylene resin, metal hydroxide, phenolic anti-oxidant, salicylic acid-containing metal capture agent, hydrazine-containing metal capture agent, and metal hydroxide. Thus obtained non-halogen resin composition was applied to a conductor, thereby resulting in an insulated electrical wire. The test and evaluation were performed on the resulting insulated electrical wire. Tables 8 to 10 below show the test results exhibited by the formulations of Comparative Example B.

The components used in a preparation of the non-halogen resin composition, the method for preparing a non-halogen resin composition, the method for preparing an insulated electrical wire, and method for testing and evaluating are abbreviated in order to avoid unnecessary overlapping with Example B as described above.

TABLE 8

| | | Comparative Example B | | | | | | | | | |
|---|---|---|---|---|---|---|---|---|---|---|---|
| | | 1 | 2 | 3 | 4 | 5 | 6 | 7 | 8 | 9 | 10 |
| component | polypropylene | 70 | 70 | 70 | 70 | 70 | 70 | 70 | 70 | 70 | 70 |
| | propylene-α olefin copolymer | 20 | 20 | 20 | 20 | 20 | 20 | 20 | 20 | 20 | 20 |
| | low density polyethylene | 10 | 10 | 10 | 10 | 10 | 10 | 10 | 10 | 10 | 10 |
| | metal hydroxide | 30 | 150 | 75 | 75 | 75 | 75 | 75 | 75 | 75 | 75 |
| | phenolic anti-oxidant | 4 | 4 | 2 | 2 | 10 | 4 | 4 | 4 | 4 | 4 |
| | salicylic acid-containing metal capture agent | 0.5 | 0.5 | 0.1 | 0.5 | 0.5 | 0.05 | 2 | 0.5 | 0.5 | 0.5 |
| | hydrazine-containing metal capture agent | 3 | 3 | 1 | 3 | 3 | 3 | 3 | 2 | 10 | 3 |
| | metal oxide | 5 | 5 | 0 | 5 | 5 | 5 | 5 | 5 | 5 | 0.5 |
| evaluation | tensile elongation | pass | fail | pass | pass | pass | pass | fail | pass | pass | pass |
| | flame retardant property | fail | pass | pass | pass | pass | pass | pass | pass | pass | pass |
| | abrasion resistance | fail | pass | pass | pass | pass | pass | pass | pass | pass | pass |
| | Flexibility | pass | pass | pass | pass | pass | pass | pass | pass | pass | pass |
| | Bleeding | pass | pass | pass | fail | pass | pass | pass | pass | fail | pass |
| | long-term heat resistance I | pass | fail | pass | fail | pass | fail | pass | fail | pass | fail |
| | long-term heat resistance II | fail | fail | fail | fail | pass | fail | pass | fail | pass | fail |

TABLE 9

| | | Comparative Example B | | | | | | | | | |
|---|---|---|---|---|---|---|---|---|---|---|---|
| | | 11 | 12 | 13 | 14 | 15 | 16 | 17 | 18 | 19 | 20 |
| component | Polypropylene | 70 | 45 | 70 | 52 | 90 | 0 | 75 | 50 | 67 | 55 |
| | propylene-α olefin copolymer | 20 | 55 | 15 | 45 | 0 | 80 | 15 | 45 | 30 | 30 |
| | low density polyethylene | 10 | 0 | 15 | 3 | 10 | 20 | 10 | 5 | 3 | 15 |
| | Metal hydroxide | 75 | 75 | 75 | 75 | 75 | 75 | 75 | 75 | 75 | 75 |
| | phenolic anti-oxidant | 4 | 4 | 4 | 4 | 4 | 4 | 4 | 4 | 4 | 4 |
| | salicylic acid-containing metal capture agent | 0.5 | 0.1 | 0.1 | 0.1 | 0.1 | 0.1 | 0.1 | 0.1 | 0.1 | 0.1 |
| | hydrazine-containing metal capture agent | 3 | 3 | 3 | 3 | 3 | 3 | 3 | 3 | 3 | 3 |
| | Metal oxide | 15 | 5 | 5 | 5 | 5 | 5 | 5 | 5 | 5 | 5 |
| evaluation | tensile elongation | fail | pass | pass | pass | pass | pass | pass | pass | pass | pass |
| | Flame retardant property | pass | pass | pass | pass | pass | fail | pass | pass | pass | pass |
| | abrasion resistance | pass | fail | pass | fail | pass | fail | pass | fail | fail | fail |

TABLE 9-continued

| | Comparative Example B | | | | | | | | | |
|---|---|---|---|---|---|---|---|---|---|---|
| | 11 | 12 | 13 | 14 | 15 | 16 | 17 | 18 | 19 | 20 |
| Flexibility | pass | pass | fail | pass | fail | pass | fail | pass | pass | pass |
| Bleeding | pass | pass | pass | pass | pass | pass | pass | pass | pass | pass |
| long-term heat resistance I | fail | pass | pass | pass | pass | pass | pass | pass | pass | pass |
| long-term heat resistance II | fail | pass | pass | pass | pass | pass | pass | pass | pass | pass |

TABLE 10

| | Comparative Example B | | |
|---|---|---|---|
| | | 21 | 22 |
| component | Polypropylene | 50 | 70 |
| | Ethylene-α olefin copolymer | 40 | 20 |
| | low density polyethylene | 10 | 10 |
| | Metal hydroxide | 75 | 75 |
| | phenolic anti-oxidant | 4 | 4 |
| | salicylic acid-containing metal capture agent | 0.5 | 0.1 |
| | hydrazine-containing metal capture agent | 3 | 5 |
| | Metal oxide | 5 | 5 |
| evaluation | tensile elongation | pass | pass |
| | Flame retardant property | pass | pass |
| | abrasion resistance | fail | fail |
| | Flexibility | pass | pass |
| | Bleeding | pass | pass |
| | long-term heat resistance I | pass | pass |
| | long-term heat resistance II | pass | pass |

As can be seen from Tables 5 through 7 above, Examples B-1 through B-24 exhibited excellent in tensile elongation, flame retardant property performance, abrasion resistance, flexibility, bleeding, and long-term heat resistance I. Further, with respect to long-term heat resistance II, the insulated electrical wire which was covered with the non-halogen resin composition of Example B also showed excellent long-term heat resistance II, although it was mixed with the insulated electrical wire which was covered with PCV resin composition To the contrary, as can be seen from Tables 8 to 10 above, Comparative Examples B-1, B-2, B-4 to B-20 exhibited poor tensile elongation, flame retardant property performance, abrasion resistance, flexibility, bleeding, long-term heat resistance I, in comparison with the non-halogen resin composition of Example B. Further, although Comparative Example B (insulated electrical wire), in particular, Comparative Example B-3 exhibited sufficient mechanical properties, flame retardant property, and flexibility, it showed deteriorated long-term heat resistance, when mixed with the insulated electrical wire that was covered with the PCV resin composition. Also, Comparative Examples B-21 and B-22 in which propylene-alpha olefin copolymer component was substituted with ethylene-alpha copolymer showed sufficient flexibility, but deteriorated abrasion resistance.

In accordance with one aspect of the present invention, since the non-halogen resin composition comprises (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; and (D) 0.5 to 2 parts by weight of a hydrazine-containing metal capture agent, it exhibits excellent mechanical property such as abrasion resistance, flame retardant property, flexibility, and long-term heat resistance in comparison with a conventional non-halogen resin composition.

In accordance with another aspect of the present invention, since the non-halogen resin composition, comprises (A) 100 parts by weight of a base resin, containing 50 to 75 weight percent of a polypropylene, 20 to 40 weight percent of a propylene-alpha olefin copolymer, and 5 to 10 weight percent of a low density polyethylene; (B) 50 to 100 parts by weight of a metal hydroxide; (C) 3 to 5 parts by weight of a phenolic anti-oxidant; (D) 0.1 to 1.0 part by weight of a salicylic acid-containing metal capture agent; (E) 3 to 5 parts by weight of a hydrazine-containing metal capture agent; and (F) 1 to 10 parts by weight of a metal oxide, it exhibits excellent mechanical property such as abrasion resistance, flame retardant property, flexibility, and long-term heat resistance in comparison with a conventional non-halogen resin composition. Further, in a case where the afore-mentioned non-halogen resin composition keeps in contact with PCV resin composition for a long period of time, it also retains good long-term heat resistance.

In accordance with the still another aspect of the present invention, since the insulated electrical wire comprises a conductor, and an insulating layer disposed over a circumference of the conductor and formed of the non-halogen resin composition in accordance with the present invention, it exhibits excellent mechanical property such as abrasion resistance, flame retardant property, flexibility, and long-term heat resistance in comparison with a conventional insulated electrical wire. Further, in a case where the insulated electrical wire having the insulating layer that is prepared from the non-halogen resin composition in accordance with the second embodiment of the present invention and an insulated electrical wire prepared from PCV resin composition are bound together, it also retain excellent long-term heat resistance.

In accordance with the still another aspect of the present invention, since the wire harness comprises includes at least one insulated electrical in accordance with the present invention, it exhibits excellent mechanical property such as abrasion resistance, flame retardant property, flexibility, and long-term heat resistance in comparison with a conventional wire harness.

While a preferred embodiment of the invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims.

The invention claimed is:

1. An insulated electrical wire, comprising:
a conductor, and
an insulating layer disposed over a circumference of the conductor and formed of the non-halogen resin composition comprising:

(A) 100 parts by weight of a base resin, containing 50 to 75 weight percent of a polypropylene, 20 to 40 weight percent of a propylene-alpha olefin copolymer, and 5 to 10 weight percent of a low density polyethylene;
(B) 50 to 100 parts by weight of a metal hydroxide;
(C) 3 to 5 parts by weight of a phenolic anti-oxidant; and
(D) 0.5 to 2 parts by weight of a hydrazine-containing metal capture agent.

2. A wire harness comprising a plurality of insulated electrical wires, the insulated electrical wires being bounded together and including at least one insulated electrical wire according to claim 1.

3. An insulated electrical wire, comprising:
a conductor, and
an insulating layer disposed over a circumference of the conductor and formed of the non-halogen resin composition comprising:

(A) 100 parts by weight of a base resin, containing 50 to 75 weight percent of a polypropylene, 20 to 40 weight percent of a propylene-alpha olefin copolymer, and 5 to 10 weight percent of a low density polyethylene;
(B) 50 to 100 parts by weight of a metal hydroxide;
(C) 3 to 5 parts by weight of a phenolic anti-oxidant;
(D) 0.1 to 1.0 part by weight of a salicylic acid-containing metal capture agent;
(E) 3 to 5 parts by weight of a hydrazine-containing metal capture agent; and
(F) 1 to 10 parts by weight of a metal oxide.

4. A wire harness comprising a plurality of insulated electrical wires, the insulated electrical wires being bounded together and including at least one insulated electrical wire according to claim 3.

* * * * *